United States Patent
Banerjee et al.

(10) Patent No.: US 9,219,694 B2
(45) Date of Patent: Dec. 22, 2015

(54) CONTENT ADDRESSABLE MEMORY WITH REDUCED POWER CONSUMPTION

(71) Applicant: Wisconsin Alumni Research Foundation, Madison, WI (US)

(72) Inventors: Suman Banerjee, Madison, WI (US); Yadi Ma, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 20 days.

(21) Appl. No.: 13/841,477

(22) Filed: Mar. 15, 2013

(65) Prior Publication Data

US 2014/0269307 A1  Sep. 18, 2014

(51) Int. Cl.
*H04L 12/851* (2013.01)

(52) U.S. Cl.
CPC ............. *H04L 47/2441* (2013.01); *H04L 47/24* (2013.01)

(58) Field of Classification Search
USPC ............ 370/392, 389, 401, 230, 235, 395.42, 370/395.32, 474, 320; 711/108
See application file for complete search history.

(56) References Cited

U.S. PATENT DOCUMENTS

| | | | |
|---|---|---|---|
| 2002/0191605 A1* | 12/2002 | Lunteren et al. | 370/389 |
| 2003/0108043 A1* | 6/2003 | Liao | 370/392 |
| 2008/0212586 A1 | 9/2008 | Banerjee | |
| 2010/0067535 A1* | 3/2010 | Ma et al. | 370/401 |
| 2012/0137060 A1* | 5/2012 | Akerib et al. | 711/105 |
| 2012/0243538 A1* | 9/2012 | Zeffer et al. | 370/392 |
| 2012/0275466 A1* | 11/2012 | Bhadra et al. | 370/419 |
| 2014/0215144 A1* | 7/2014 | Valency et al. | 711/108 |

OTHER PUBLICATIONS

Haung et al. "Fast and scalable multi-TCAM classification engine for wide policy table lookup", Mar. 28-30, 2005, IEEE, Advanced Information Networking and Applications, 2005. AINA 2005. 19th International Conference, p. 792-797 vol. 1.*

* cited by examiner

*Primary Examiner* — Habte Mered
*Assistant Examiner* — Rownak Islam
(74) *Attorney, Agent, or Firm* — Boyle Fredrickson, S.C.

(57) ABSTRACT

A ternary content addressable memory (TCAM) provides a pre-classifier section which analyzes a subset of received data values to forward the entire received data values only to selected portions of a TCAM likely holding that data value to substantially reduce power consumption required for classification.

15 Claims, 6 Drawing Sheets

CONTENT ADDRESSABLE MEMORY WITH REDUCED POWER CONSUMPTION

STATEMENT REGARDING FEDERALLY SPONSORED RESEARCH OR DEVELOPMENT

This invention was made with government support under 0855201 awarded by the National Science Foundation. The government has certain rights in the invention.

CROSS REFERENCE TO RELATED APPLICATION

--

BACKGROUND OF THE INVENTION

The present invention relates to content addressable memories used for high-speed packet classification and the like and in particular to a ternary content addressable memory system providing reduced power consumption.

Standard random access computer memory stores data at memory locations that may be individually accessed, for example for reading, by providing the memory with an address of the memory location. The memory responds to the identified address by providing a data element stored in the memory location of that address. Random access memory allows high-speed access to data when the storage address of the data is known; however, when data of a particular value must be located and the address is not known, random access memory requires a time-consuming search in which multiple memory locations must be addressed in turn, and the stored data read and tested against the desired value.

Content addressable memories (CAMs), in some respect, are the mirror counterpart of random access memory, allowing data to be located simply by knowing the desired data value. The CAM memory receives a desired data value and then returns one or more addresses (or the contents of those addresses) where the data is located. Such memories are termed associative memories and this type of search is termed an associative search herein.

A special class of CAM memories are ternary content addressable memories (TCAMs) which allow the desired data value to be specified with wildcard characters allowing for a ranges of data values to be returned where only the non-wildcard characters need to match.

TCAMs are used in high-performance network hardware such as routers to perform data packet classification. Such classifications are often concerned with ranges of data values which the wildcard feature facilitates.

Packet classification is used in a variety of services, including not only standard routing of network packet data among nodes but also providing varied quality of service for different packets (QoS), performing packet filtering for security devices such as firewalls and malware detection systems (for example, denying all packets from a known source), implementing policy routing (for example, routing all voice over IP (VOIP) traffic over a separate network), and providing traffic shaping (for example, ensuring that no one source overloads the network).

TCAMs when used to classify network data may receive multiple arguments from a packet, typically derived from the packet header, and including, for example, source and destination IP address, source and destination port numbers, and data protocol. These arguments are substantially independent of each other and describe different qualities of the packet. The TCAM holds classification rules that are triggered depending on particular argument values or ranges of values. The TCAM matches argument values of the packet to the argument values of the classification rules, and outputs that classification rule that represents the first match, normally including an action (e.g. accept or deny). The classification rules are placed in the TCAM in order of priority to naturally resolve situations where multiple classification rules may apply.

While TCAMS provide extremely fast packet classification, they have the disadvantage of high power consumption that scales proportionally to the number of search entries. A typical 18 megabit TCAM device can consume up to 15 watts of power when all of the entries are searched.

SUMMARY OF THE INVENTION

The inventors have determined that some important class of searches may be pre-classified according to a relatively small set of rules that look at only part of the data needed for classification to steer the classification process to a selected portion of the TCAM. The present invention, accordingly, provides a pre-classifier for a TCAM determining which blocks of the TCAM are needed for the search and activating only those blocks to save electrical energy. This approach is facilitated by the development of a technique for defining the small set of rules of the pre-classifier, providing a method of sorting the rules of the TCAM to concentrate the rules in a limited number of blocks, and accommodating imperfect pre-classification.

Specifically, in one embodiment, the invention provides a system for classifying packets having multiple arguments. The system includes a set of ternary content addressable memory blocks holding classification rules dependent on multiple arguments, wherein classification rules of the blocks are configured to be associatively searched as a group for particular argument values and wherein the number of activated blocks participating in the group is controlled by a selection signal. The system also includes a pre-classifier circuit holding pre-classification rules dependent only on a predetermined subset of the multiple arguments, wherein the pre-classifier receives a packet and matches it to a pre-classification rule based on the subset of the multiple arguments to identify a subset of the blocks likely holding classification rules linked to the packet, and wherein the matching pre-classification rule provides the selection signal activating the subset of blocks for receiving the packet to perform an associative search of the multiple arguments of the packet.

It is thus a feature of at least one embodiment of the invention to provide an efficient method of determining what portions of a TCAM are needed for a classification event so that only those portions may be activated.

The arguments may each describe independent qualities of the packet.

It is thus a feature of at least one embodiment of the invention to provide a pre-classification event that may employ a compact set of rules by looking at only an incomplete portion of the classification data.

The blocks not in the subset of the blocks may use less power than the blocks in the subset of the blocks during the associative search.

It is thus a feature of at least one embodiment of the invention to reduce power consumption required by a particular classification event.

The classification rules may be dependent on ranges of the arguments.

It is thus a feature of at least one embodiment of the invention to provide a pre-classification system that works with wildcard characters and hence ranges.

The pre-classifier may forward the packet to at least one block not in the subset and hold classification rules not covered by pre-classification rules.

It is thus a feature of at least one embodiment of the invention to accommodate a set of incomplete pre-classification rules by providing for one or more catchall general classification blocks.

The classification rules may be given a priority and the pre-classifier may select among multiple matches according to the priority ordering.

It is thus a feature of at least one embodiment of the invention to handle conflicting matches such as occur with a catch-all matching block.

Each ternary content addressable memory block may provide only a single rule matching and the pre-classifier may employ one or more ternary content addressable memory block to hold the pre-classification rules and wherein the pre-classification rules may identify a random access memory location defining the subset of blocks.

It is thus a feature of at least one embodiment of the invention to provide a pre-classifier that may be integrated into conventional TCAM blocks by employing a standard memory to translate a pre-classification rule hit into multiple activation blocks.

The ternary content addressable memory blocks and the random access memory may be in a single ternary content addressable memory.

It is thus a feature of at least one embodiment of the invention to provide a system that may be wholly implemented by a conventional TCAM.

The packets may be data transmission packets having headers and data, and the arguments include concatenated header information selected from the group consisting of source address, destination address, source port, destination port, and protocol.

It is thus a feature of at least one embodiment of the invention to provide a system suitable for high-speed network data classification.

The subset of the multiple arguments used by the pre-classifier may be source address and destination address.

It is thus a feature of at least one embodiment of the invention to identify a subset of the header information that appears to be strongly related to classification decisions.

Each classifier rule is covered by only one-pre-classifier rule if any.

It is thus a feature of at least one embodiment of the invention to provide nonoverlapping, pre-classification rules to minimize the number of TCAM blocks that need to be activated.

The pre-classification rules may be developed by selecting a subset of the arguments of the packets and defining multi-dimensional regions within a space defined by ranges of the subset of arguments, each argument of the subset of arguments being a dimension of the space. The multidimensional regions may then be collected together according to their fitting within one or more specific envelope multidimensional region enclosing the multidimensional regions provided that the number of enclosed multidimensional regions is less than a predetermined block size related to the number of classification rules in a block. Multidimensional regions not fully fitting within a specific envelope multidimensional region may be collected in a general list. Classification rules of each specific envelope multidimensional region may then be loaded into separate specific TCAM blocks and the classification rules of the general list loaded into a general TCAM block. The pre-classifier is then provided with information about the specific envelope multidimensional regions in order to direct classification requests related to argument data for associative classification on specific CAM blocks selected according to a given envelope multidimensional region embracing the argument data.

It is thus a feature of at least one embodiment of the invention to provide a simple method of automatically generating effective pre-classification rules based on classification rules developed by other users.

These particular objects and advantages may apply to only some embodiments falling within the claims and thus do not define the scope of the invention.

DETAILED DESCRIPTION OF THE PREFERRED EMBODIMENT

Figure 1:
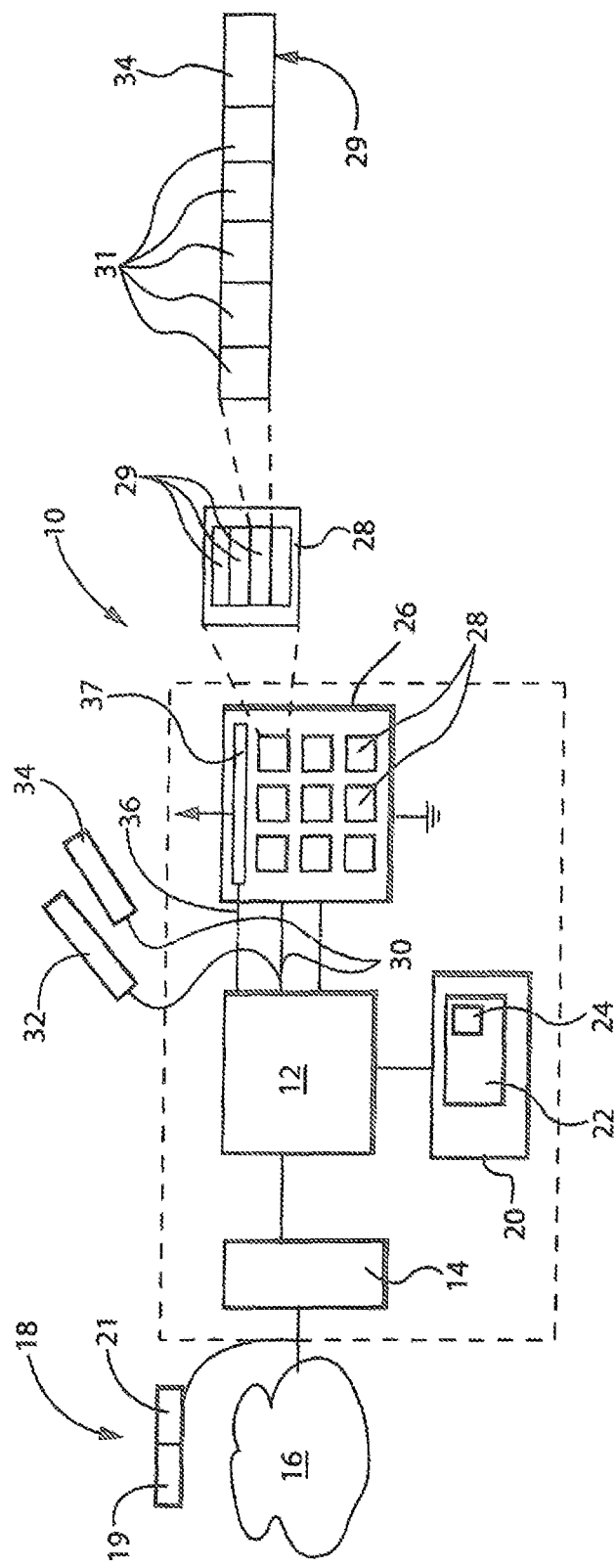
FIG. 1 is a simplified block diagram of a computing device for classifying packets employing a ternary content addressable memory providing one possible hardware platform for the present invention, where the TCAM provides multiple individually actuable blocks holding rules relating multiple predicate arguments of the packets.

Referring now to FIG. 1, a computing device 10, for example, such as may provide for the basis of a router or other similar data packet classifier, may provide for one or more processors 12 connected via network interfaces 14 to a source of network traffic 16 so that the processors 12 may receive and transmit data packets 18 from and to the source of network traffic 16. The source of network traffic 16 may, for example, be the Internet or other network of types well known in the art. Generally, the data packets 18 will include a packet header 19 having multiple arguments including but not limited to source IP address, destination IP address, source port number, destination port number, and protocol. The data packets 18 will also include a payload portion 21 holding the data being transmitted by the data packet 18.

The processor 12 may also communicate with random access memory system 20, for example, being any one or combination of random access solid-state memory (e.g. SRAM), flash memory, disk drives, or the like. The memory system 20 provides for standard address-driven architecture where stored data is accessed by providing one or more addresses to the memory system 20. Memory system 20 may include a device-operating program 22 including a pre-classification program 24 implementing the pre-classification system of the present invention.

The processor 12 may also communicate with a TCAM 26 having multiple blocks 28 each of which may independently or in tandem perform associative searches of contained data. In this regard, the TCAM 26 may exchange data with the processor 12 over data lines 30. For example, data received by the TCAM 26 from the processor 12 may include arguments 32 of the packet header 19 for a packet 18 that should be classified. Data received by the processor 12 from the TCAM 26 may include a resulting rule action 34 indicating classifications of a given packet 18 and thus response that should be taken with respect to a given packet 18. The rule actions 34 are part of classification rules 29 held in the TCAM 26 and associated with predicate arguments 31 related to the packet header 19 from the given packet 18 during an associative search of the blocks 28.

Generally, the blocks 28 may operate in tandem on one or more different classification searches. In addition, classification searches may be limited to particular blocks 28. In this regard, the processor 12 may communicate with the TCAM 26 by means of control lines 36 to power gating circuitry 37 which may activate or deactivate particular ones of the blocks 28. This deactivation may remove power from the blocks 28 entirely or may simply hold it in a quiescent state not participating in the classification process so that low or no power is consumed by such blocks 28. Generally the power consumed by the blocks 28 held in the quiescent state will be substantially less than the power consumed by the blocks 28 actively performing an associative search.

Selected blocks 28, may hold a set of classification rules 29 that hold predicate arguments 31 linked to a rule action 34. A classification rule 29 will be invoked upon a matching of the predicate arguments 31 for the classification rule 29 with data of the packet header 19 of the packet 18. Generally, the predicate arguments 31 define a single or range of each of the five dimensions of the packet header 19. A range is normally denoted by employing wildcard characters in the arguments 31 where the wildcard character represents a bit that matches both of zero or one.

TABLE I

| Rule | $F_1$ | $F_2$ | $F_3$ | $F_4$ | $F_5$ | Action |
|------|-------|-------|-------|-------|-------|--------|
| R0 | 000* | 111* | 10 | * | UDP | $action_0$ |
| R1 | 000* | 10* | 01 | 10 | TCP | $action_1$ |
| R2 | 000* | 01* | * | 11 | TCP | $action_0$ |
| R3 | 0* | 1* | * | 01 | UDP | $action_2$ |
| R4 | 0* | 0* | 10 | * | UDP | $action_1$ |
| R5 | 000* | 0* | * | 01 | UDP | $action_1$ |
| R6 | * | * | * | * | UDP | $action_3$ |
| R7 | * | * | * | * | TCP | $action_4$ |

Example classification rules 29 noted R0-R7 are shown in TABLE I providing predicate arguments 31 $F_1$-$F_5$ that must match, as noted above, packet header 19 of the packet 18 in order to designate a particular rule action 34 ($action_0$-$action_7$). Thus, for example, rule R0 may require a source IP address (predicate argument $F_1$) having a prefix of 000x where x is the wildcard character indicating a match can occur with prefixes of either 0000 or 0001 binary in the packet header 19. For an implicit 32-bit IP address, this represents a range from 0000 . . . 0000 to 0001 . . . 0000. The range implicit in the predicate arguments 31 can generally be understood to describe N-dimensional rectangles with sides aligned with the coordinate axes as will be discussed below.

Figure 2:
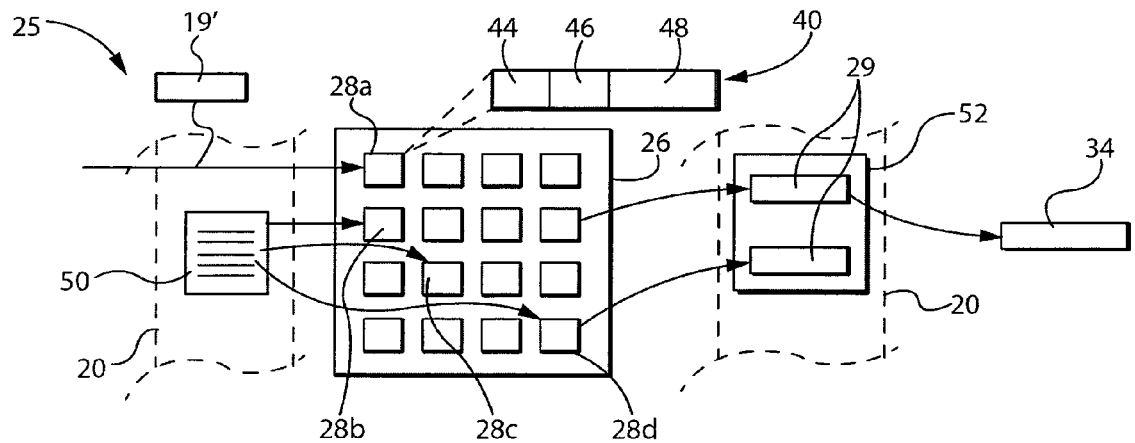
FIG. 2 is a data flow diagram showing a pre-classifier of the present invention in one block of the TCAM mapping classification tasks through an SRAM table to other specific and general TCAM blocks for tandem classifications and showing a resolver selecting among multiple identified rules.

Referring now to FIGS. 1 and 2, in one embodiment of the present invention, one or more of the blocks 28a may implement portions of a pre-classifier and may hold a set of pre-classification rules 40 that may link a subset of the packet header 19', being less than all of the arguments of the packet header 19 from the packet 18 (shown in FIG. 1). In one embodiment of the invention, the subset of the packet header 19' consists of source IP address and destination IP address only, these arguments determined empirically to provide for an efficient pre-classification in part because they are more specific to the rules than the other three fields of the packet header 19.

The pre-classification rules 40 thus each provide a first predicate argument 44 related to the source IP address and a second predicate argument 46 related to the destination IP address and map those predicate arguments to a block configuration index 48 as will be described. Generally, the pre-classifier implementing the rules 40 will look at only a subset of the arguments 31 of the classification rules 29 and so may be implemented by substantially fewer blocks 28, then implement the classification rules 29 and in one embodiment may be implemented by a single block 28. It should be noted that the trade-off of this compact implementation is that in some cases the rules 40 will not be able to unambiguously identify a classification rule 29 relevant to the given packet 18 being pre-classified and generally will only resolve classifications that include multiple classification rules 29.

Once the subset of the packet header 19' is received by the pre-classifier implemented in block 28a (and in program 24 described above with respect to FIG. 1), the block configuration index 48 of the matching pre-classification rule 40 is provided to a configuration table 50, for example, stored in random access memory system 20. This configuration table 50 identifies those blocks 28 holding the classification rules 29 relevant to the given packet 18. Information about the relevant blocks 28 is used to activate selected blocks necessary for the classification process, for example blocks 28b and 28c as identified by the configuration table 50, and in addition, a block 28d not identified by the configuration table 50 but nevertheless always activated as will be discussed below. A first set of these blocks 28b and 28c holding classification rules 29 as identified by the configuration table 50 will be termed "specific" blocks and block 28d will be termed a "general" block, the terms "specific" and "general" being arbitrary and used simply for clarity and distinguishing the block types. For each packet 18, the pre-classifier will find at most one specific block 28 necessary for the classification (and possibly no specific blocks 28). However, for each packet 18, a general block 28 is always identified and possibly multiple general blocks 28.

Full packet header 19 is then provided to those blocks (blocks 28b, 28, and 28d) for associative lookup. The pre-classification implemented in part by block 28a may therefore select less than all of the blocks 28 for the full classification greatly reducing the power consumption of the TCAM 26.

The results of that lookup are provided to a priority table 52 (also in random access memory system 20), the results typically identifying one or more classification rules 29, for example, one classification rule 29 from a specific block (block 28b or 28c in this example) and one classification rule 29 from the general block (28d in this example). As noted, the multiple classification rules 29 returned in the search have been stored in the blocks 28 in a priority order, so that program 24 may identify a single one of multiple returned classification rules 29 according to priority determined by address location within the blocks 28 and the relative ordering of the blocks 28 within the TCAM 26. That is, the priorities of the returned classification rules 29 are compared and one selected according to the highest priority.

Referring now to TABLE II, a set of classification rules 29 are shown with respect to an example explaining creation of the rules 40 of the pre-classifier.

TABLE II

| Rule Number | Source address | Destination address | Source port | Destination port | Protocol |
|---|---|---|---|---|---|
| 0 | 228.128.0.0/9 | 0.0.0.0/0 | 0:65535 | 0:65535 | 0x01 |
| 1 | 223.0.0.0/9 | 0.0.0.0/0 | 0:65535 | 0:65535 | 0x06 |
| 2 | 0.0.0.0/1 | 175.0.0.0/8 | 0:65535 | 0:65535 | 0x06 |
| 3 | 0.0.0.0/1 | 225.0.0.0/8 | 0:65535 | 0:65535 | 0x01 |
| 4 | 0.0.0.0/1 | 225.0.0.0/8 | 0:65535 | 0:65535 | 0x06 |
| 5 | 128.0.0.0/1 | 123.0.0.0/8 | 0:65535 | 0:65535 | 0x06 |
| 6 | 128.0.0.0/1 | 37.0.0.0/8 | 0:65535 | 0:65535 | 0x06 |
| 7 | 0.0.0.0/0 | 123.0.0.0/8 | 0:65535 | 0:65535 | 0x06 |
| 8 | 178.0.0.0/7 | 0.0.0.0/1 | 0:65535 | 0:65535 | 0x06 |
| 9 | 0.0.0.0/1 | 172.0.0.0/7 | 0:65535 | 0:65535 | 0x06 |
| 10 | 0.0.0.0/1 | 226.0.0.0/7 | 0:65535 | 0:65535 | 0x06 |
| 11 | 128.0.0.0/1 | 120.0.0.0/7 | 0:65535 | 0:65535 | 0x01 |
| 12 | 128.0.0.0/1 | 120.0.0.0/7 | 0:65535 | 0:65535 | 0x06 |
| 13 | 128.0.0.0/1 | 38.0.0.0/7 | 0:65535 | 0:65535 | 0x06 |

Figure 3:
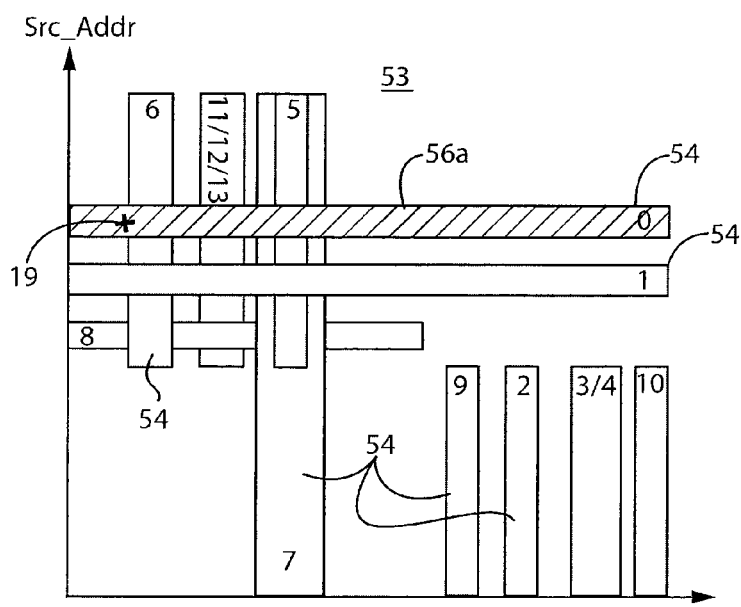
FIG. 3 is a diagram showing a mapping of two dimensions of argument predicates for classification rules to a set of overlapping, axis-aligned rectangles for generation of the pre-classifier classification, the two dimensions of argument predicate being those used for pre-classification rules.

Referring to FIG. 3, each of these columns of TABLE II provides a predicate argument 31 of classification rules 29. The first two columns of TABLE II, being a subset of all the predicate arguments 31 related to source IP address and destination IP address, are also used by the predicate arguments 46 and 44 of the pre-classification rules 40.

The first two of these predicate arguments 31 define a range of source and destination addresses that may be mapped to a size and location of a rule rectangle 54 being, in this case, a two-dimensional planar rectangle with axes aligned with sides in a plane 53 defined by orthogonal axes of source IP address and destination IP address. For example, rule 0 source address (Src_addr) of 228.12 8.0.0/9 is a CIDR (classless inter-domain routing) that defines a range of addresses mapped to a rule rectangle 54 labeled 0 in FIG. 3. The rule rectangles 54 for the remaining rules of TABLE II are also displayed in FIG. 3. As shown in FIG. 3 some of the rule rectangles 54 will overlap with other rule rectangles 54. It should be understood that the rule rectangles 54 are projections of five dimensional volumes in the plane 53 and thus a limited set of dimensions of packet data relevant to the pre-classification process.

This mapping of the rule rectangles 54 may be used to generate envelope rectangles 56 that will be used to define the pre-classification rules 40 and in particular the arguments 44 and 46 for each of the rules 40. This process generally involves collecting each of the rectangles 54 into one or more envelope rectangles 56 that serve to cluster the classification rules 29, each cluster defining a particular block 28 of the TCAM 26 into which the associated classification rules 29 will be loaded. So this process also allocates the classification rules 29 to the blocks 28. As will be seen, generally the envelope rectangles 56 will not necessarily cover the whole two-dimensional space occupied by the rectangles 54. The envelope rectangles 56 will further be nonoverlapping and the rectangles 54 will be in no more than one envelope rectangle although they may not be covered by any envelope rectangle.

The process of developing the envelope rectangles 56 in this example may begin by selecting an envelope rectangle 56a equal to the size of the rule rectangles 54 for the first classification rule 29 (R0) as shaded in FIG. 3. The number of rectangles 54 in envelope rectangle 56a is compared to a maximum number of rules that may be in any block 28 (Rule_Maximum) as is predetermined by a simple calculation relating rule size to block size specific to the hardware. In this example, Rule_Maximum, will be assumed to equal 5.

Figure 4:
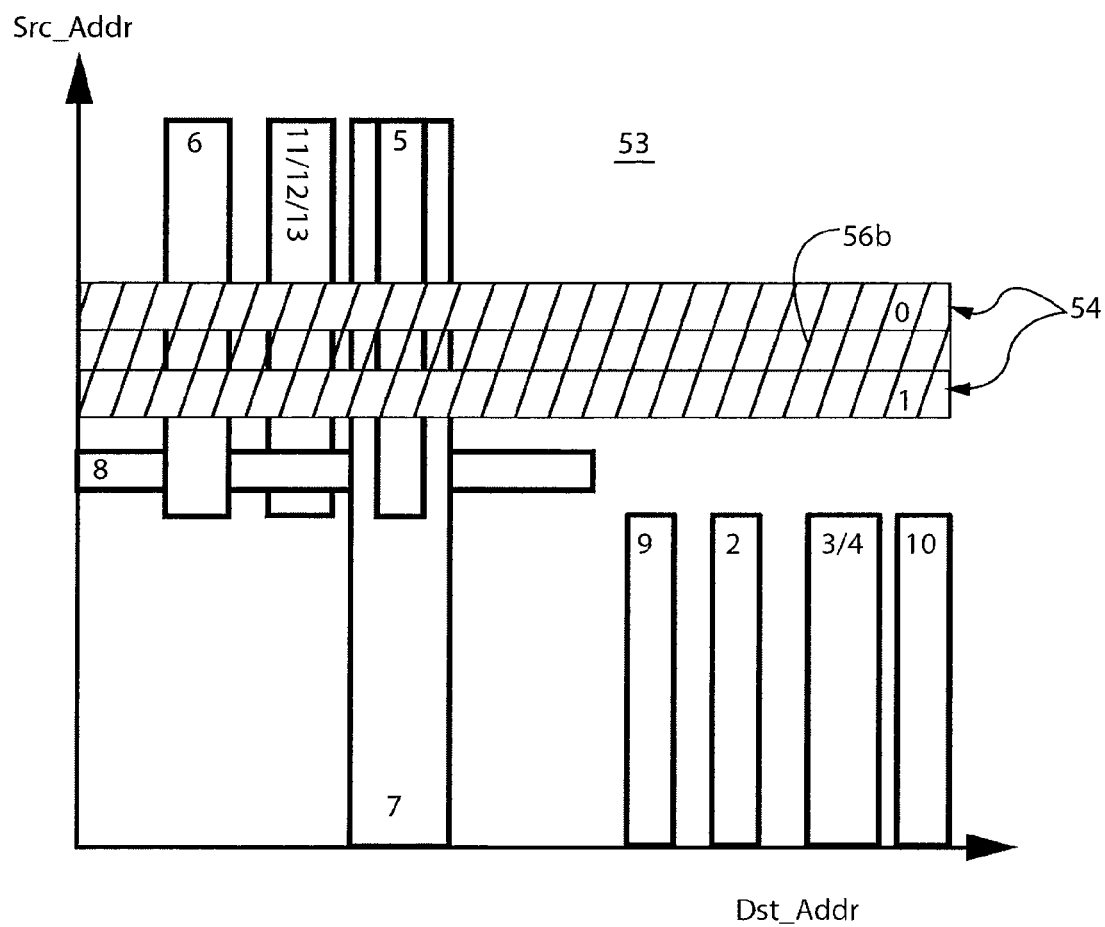
FIGS. 4-6 are figures similar to that of FIG. 3 showing three iterations of methods of generating pre-classification rules covering the classification rules of FIG. 3.

Referring now to FIG. 4, because after this first step the number of rectangles 54 in envelope rectangle 56a is less than Rule_Maximum, the envelope rectangle 56a is expanded into envelope rectangle 56b covering rectangles 54 for rule R0 and the next rule R1 as well as covering the space between that is necessarily bounded by a single envelope rectangle 56.

Again the number of rule rectangles 54 within the envelope rectangle 56b is tested against Rule_Maximum and, because the limit has not been reached, the envelope rectangle 56a is expanded next to progressively cover rectangles 54 already overlapped by envelope rectangle 56b (if any) and if there are none then to the next rule in sequence.

Figure 5:
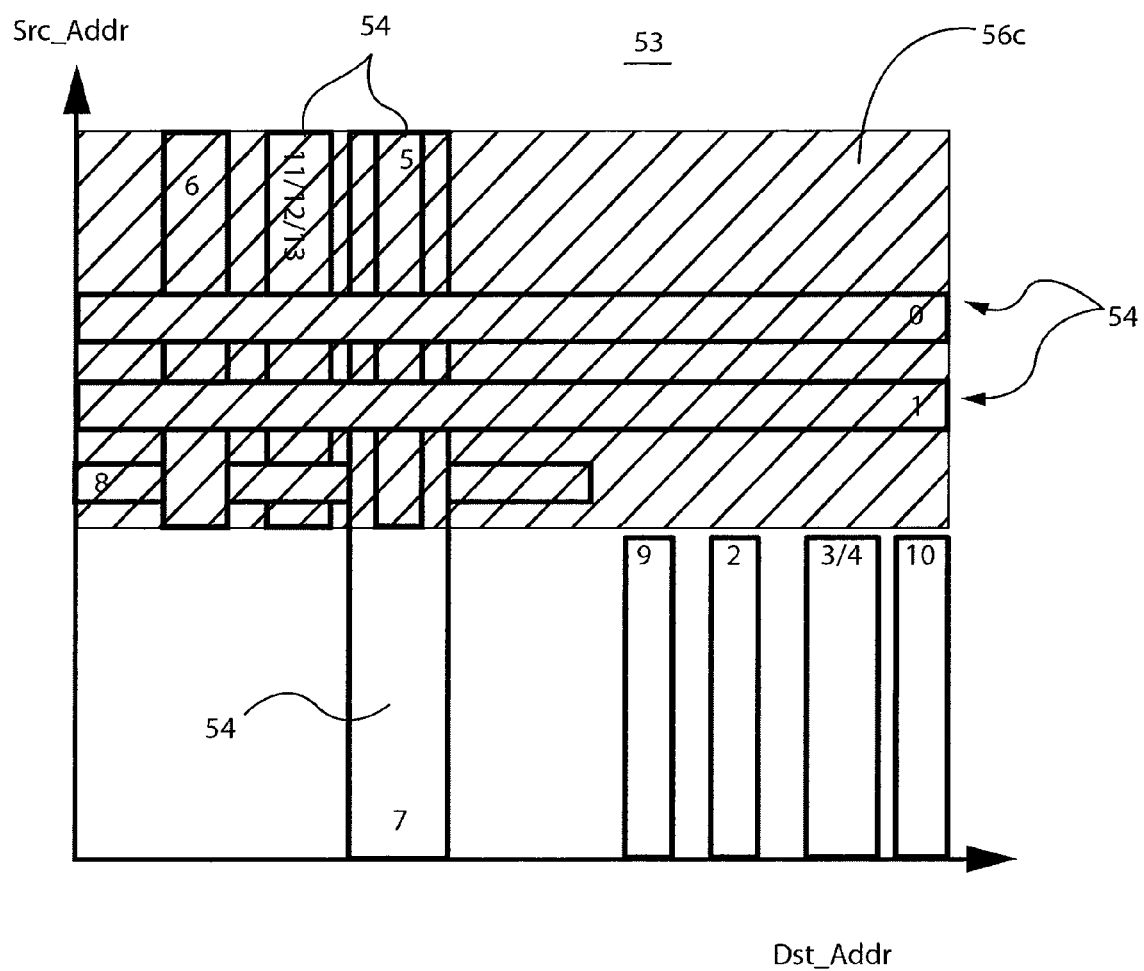

Following this rule, in this case, the envelope rectangle 56b is expanded to envelope rectangle 56c as shown in FIG. 5 now covering the rule rectangles 54 of the set of rules {0, 1, 5, 6, 8}.

At this point, Rule_Maximum has been reached and no further rule rectangles 54 may be added to the cluster of rules defined by envelope rectangle 56c. For this reason, rule rectangles 54 of rules R11, R12, R13 cannot be included in the cluster of envelope rectangle 56c despite coverage by envelope rectangle 56c as will be explained below. This distinction is observed by maintaining a list of covered rules independent of the dimensions of envelope rectangle 56c.

Likewise the rule rectangles 54 of rule R7 partially covered by envelope rectangle 56c will not be in the rule subject to the cluster of envelope rectangle 56c. Even if the Rule_Maximum had not been reached, rule rectangle 54 of rule R7 cannot be included in the envelope rectangle 56 because it would violate the condition of each rule rectangle 54 being in only one envelope rectangle 56 and the condition of non-overlap of envelopes rectangles 56.

Accordingly, the program then proceeds to consider the rule rectangle 54 of rule R9 and adopt the strategy described above to ultimately produce a second nonoverlapping envelope rectangle 56d nonoverlapping with envelope rectangle 56c and covering each of rules 2, 3, 4, 9, and 10.

The process then ceases with only rule 7, 11, 12, 13 not included in an envelope rectangle 56.

Figure 7:
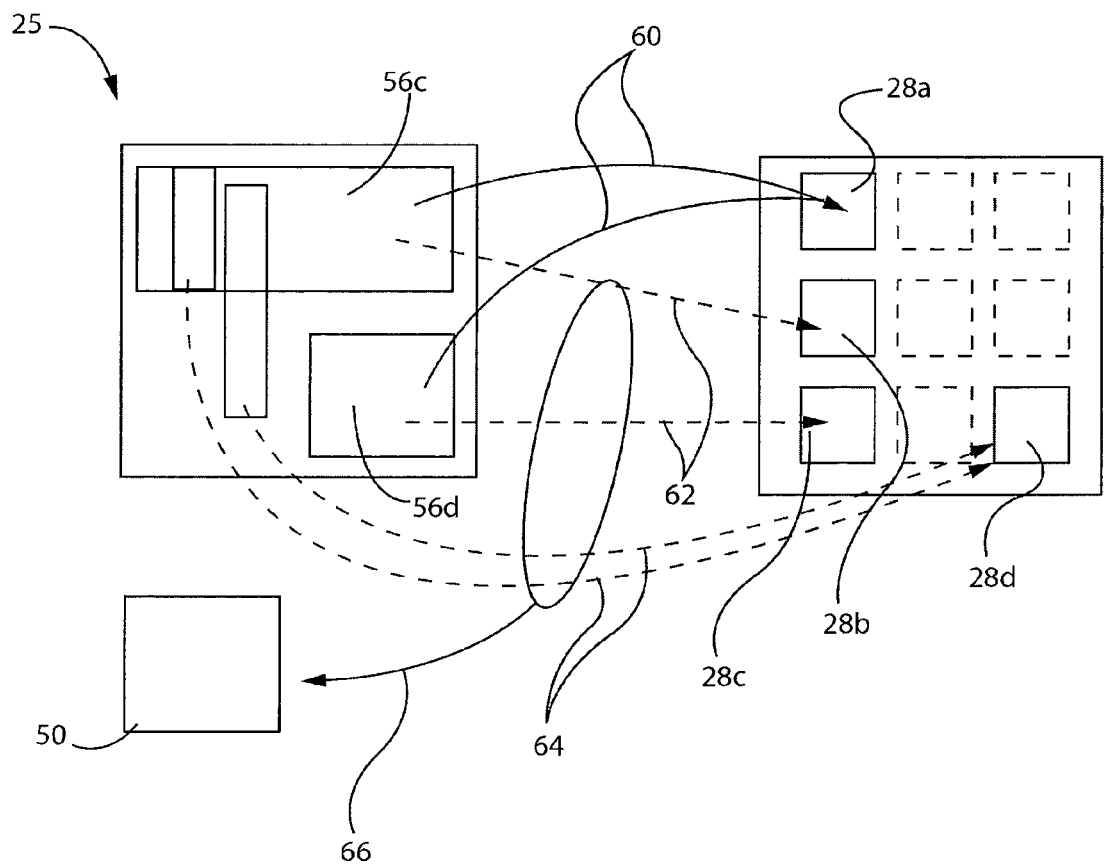
FIG. 7 is a block diagram showing mapping of three different rule argument values to TCAM blocks according to the pre-classifier classifications.

Referring now to FIG. 7, the classification rules 29 associated with any rule rectangles 54 included within a given envelope rectangle 56 are then mapped to individual "specific" blocks 28a and 28b, as indicated by dotted lines 62 generally representing any subset of the total number of blocks 28. The classification rules 29 are mapped in this process to blocks 28 so that a ranking of the priority of the classification rules 29 may be deduced from an address of the data in the blocks 28 to which they are mapped together with a block offset address internal to the block 28. For example, the highest priority classification rules 29 may be given the lowest addresses in the TCAM 26. This allows a single classification rule 29 to be identified when there are matches both in specific blocks 28b or 28c and the general block 28d.

The rule rectangles 54 not associated with any envelope rectangle 56 are mapped to a general block 28d as indicated by dotted lines 64. These mappings (as opposed to the classification rules 29) are stored in table 50 as indicated by arrow 66. These mappings are those that link an envelope rectangle 56 to its associated blocks 28 within the TCAM 26. The defining ranges of the envelope rectangles 56c and 56d are then stored in the pre-classification block 28a as indicated by arrow 60 to form the rules 40 as arguments 44 and 46.

Figure 6:
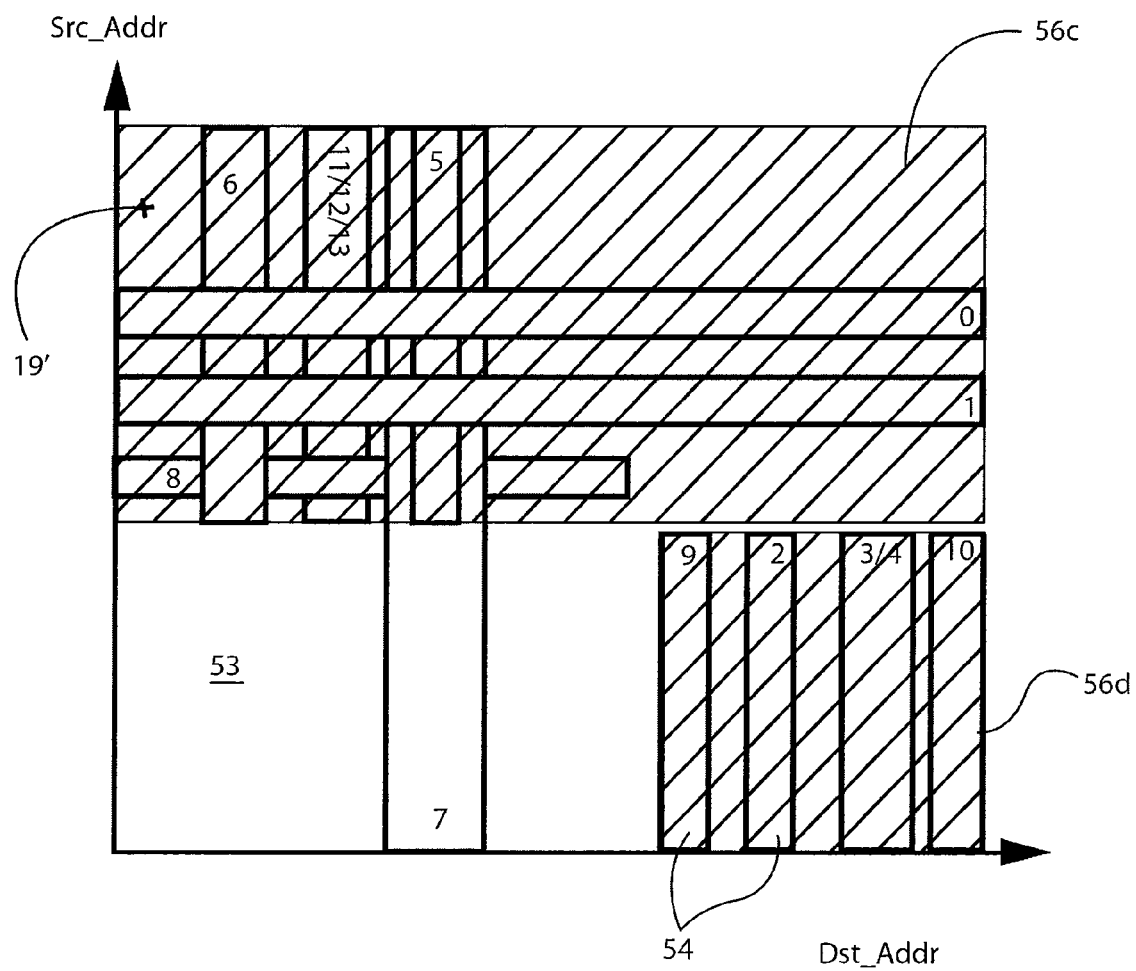

Summarizing and referring also to FIGS. 2 and 6, in operation, a given packet 18 has the subset of the packet header 19' provided to the pre-classifier formed of block 28a which identifies one rule 40 applicable to the subset of the packet header 19'. As depicted in FIG. 6, that header information may, for example, fall within the area of envelope rectangle 56*c* as detected by the operation of the TCAM 26 searching through the rules 40 and evaluating the arguments 44 and 46. The rule 40 matching the subset of the packet header 19' provides an index value indexing into table 50 which identifies particular relevant block 28 and activates those blocks for search of the full packet header 19. At this time a search of the general block is also performed and the results received by the table 52 to produce a single output classification rule 29.

It will be appreciated that the pre-classifier 25, which is implemented in part in program 24 executed by processor 12, a block 28 of the TCAM 26, and the table 50 stored in random access memory system 20, alternatively may be implemented in a separate TCAM or entirely in random access memory. It is also contemplated that the entire computing device 10 (with the possible exclusion of the network interface 14) may be implemented in a TCAM 26 to the extent that the TCAM is provisioned with a processor 12 and random access memory system 20.

Generally the rules 40 do not need to change unless the classification rules 29 change and this process of developing the pre-classification can be done with relatively low total overhead in real time as rules need to be updated.

The present invention hereby incorporates by reference the paper: A Smart Pre-Classifier to Reduce Power Consumption of TCAMs for Multi-Dimensional Packet Classification, Yadi Ma, Suman Banerjee, ACM SIGCOMM 2012 335-346.

"Subset" as used in this application means a set that is less than the full set of which it is a subset. "Independent" with respect to arguments for rules means that for an arbitrary packet knowing only the packet protocol, the information of any argument of the packet does constrain the value of any other argument.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor", "a processor", "TCAM" and "block," can be understood to include one or more devices that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A system for classifying packets having multiple arguments, the system comprising:

a set of ternary content addressable memory blocks holding classification rules dependent on multiple arguments, wherein classification rules of the blocks are configured to be associatively searched as a group for particular argument values and wherein a number of activated blocks participating in the group is controlled by a selection signal;

a pre-classifier circuit holding pre-classification rules dependent only on a predetermined subset of the multiple arguments, wherein the pre-classifier receives a packet and matches it to a pre-classification rule based on the subset of the multiple arguments to identify a subset of the blocks likely holding classification rules linked to the packet, and wherein the matching pre-classification rule provides the selection signal activating the subset of blocks for receiving the packet to perform an associative search of the multiple arguments of the packet; and wherein the classification rules and pre-classification rule are contained in different blocks of a single ternary content addressable memory, the different blocks sharing the same data lines to receive at least a portion of the packet in tandem.

2. The system of claim 1 wherein the arguments each describe independent qualities of the packet.

3. The system of claim 2 wherein the blocks not in the subset of the blocks use less power than the blocks in the subset of the blocks during the associative search.

4. The system of claim 3 wherein the classification rules are dependent on ranges of the arguments.

5. The system of claim 4 wherein the pre-classifier further forwards the packet to at least one block not in the subset and holding classification rules not covered by pre-classification rules.

6. The system of claim 5 wherein the classification rules are given a priority and the pre-classifier selects among (1: a matching of the packet to pre-classification rules from the subset of blocks) and (2: a matching of pre-classification rules from at least one block not in the subset) according to the priority ordering.

7. The system of claim 1 wherein each ternary content addressable memory block provides only a single rule matching and wherein the pre-classifier employs a ternary content addressable memory block to hold the pre-classification rules and wherein the pre-classification rules identify a random access memory location defining the subset of blocks.

8. The system of claim 7 wherein the ternary content addressable memory blocks and the random access memory are in a single ternary content addressable memory.

9. The system of claim 1 wherein the packets are data transmission packets having headers and data and wherein the arguments include concatenated header information selected from the group consisting of source address, destination address, source port, destination port, and protocol.

10. The system of claim 9 wherein the subset of the multiple arguments is source address and destination address.

11. The system of claim 1 wherein each classifier rule in the subset of blocks is covered by at most one pre-classifier rule.

12. A method of generating pre-classification rules for a classifier classifying packets having multiple arguments of a type having:
- a set of ternary content addressable memory blocks holding classification rules dependent on multiple arguments, wherein classification rules of the blocks are configured to be associatively searched as a group for particular argument values and wherein the number of activated blocks participating in the group is controlled by a selection signal; and
- a pre-classifier circuit holding pre-classification rules dependent only on a predetermined subset of the multiple arguments, wherein the pre-classifier receives a packet and matches it to a pre-classification rule based on the subset of the multiple arguments to identify a subset of the blocks likely holding classification rules linked to the packet, and wherein the matching pre-classification rule provides the selection signal activating the subset of blocks for receiving the packet to perform an associative search of the multiple arguments of the packet wherein the classification rules and pre-classification rule are contained in different blocks of a single ternary content addressable memory, the blocks sharing the same data lines to receive at least a portion of the packet in tandem the method comprising the steps of:

(a) selecting a subset of the arguments;

(b) defining multidimensional regions within a space defined by ranges of the subset of arguments, each argument of the subset of arguments being a dimension of the space;

(c) collecting the multidimensional regions together according to their fitting within one or more specific envelope multidimensional region enclosing the multidimensional regions provided a number of enclosed multidimensional regions is less than a predetermined block size related to the number of classification rules in a block;

(d) collecting multidimensional regions not fully fitting within a specific envelope multidimensional region in a general list;

(e) loading classification rules of each specific envelope multidimensional region into separate specific TCAM blocks;

(f) loading classification rules of the general list into general TCAM blocks; and (g) providing a pre-classifier with information about the specific envelope multidimensional regions in order to direct classification requests related to argument data for associative classification on specific CAM blocks selected according to a given envelope multidimensional region embracing the argument data.

13. The method of claim 12 wherein each of the multidimensional regions are multidimensional rectangles having axes aligned with edges.

14. The method of claim 12 wherein the packets are data transmission packets having headers and data and wherein the argument includes concatenated header information selected from the group consisting of source address, destination address, source port, destination port, and protocol.

15. The method of claim 14 wherein the subset of the multiple arguments is source address and destination address.

* * * * *